US008112937B1

(12) United States Patent
Byerley, Jr.

(10) Patent No.: US 8,112,937 B1
(45) Date of Patent: Feb. 14, 2012

(54) NATURAL GROWTH TERRARIUM PLANTER

(76) Inventor: Lester Byerley, Jr., Manahawkin, NJ (US)

( * ) Notice: Subject to any disclaimer, the term of this patent is extended or adjusted under 35 U.S.C. 154(b) by 0 days.

(21) Appl. No.: 13/134,558

(22) Filed: Jun. 11, 2011

(51) Int. Cl.
*A01G 9/00* (2006.01)

(52) U.S. Cl. .............................. 47/66.1; 47/73

(58) Field of Classification Search ............... 47/65.5, 47/66.1, 66.7, 73, 77, 82, 83, 86
See application file for complete search history.

(56) References Cited

U.S. PATENT DOCUMENTS

| 1,636,625 | A  | * | 7/1927 | Conrad ............................. 47/73 |
| 4,019,279 | A  | * | 4/1977 | Moorman et al. ............. 47/32.8 |
| 4,145,841 | A  | * | 3/1979 | Woolpert ...................... 47/66.1 |
| 5,930,951 | A  | * | 8/1999 | Wong ............................. 47/66.1 |
| 6,357,180 | B1 | * | 3/2002 | Huang ............................. 47/73 |
| 2007/0204511 | A1 | * | 9/2007 | Lee et al. ...................... 47/66.1 |

FOREIGN PATENT DOCUMENTS

| CN | 200951021 Y | * | 9/2007 |
| FR | 2690307 A3 | * | 10/1993 |

* cited by examiner

*Primary Examiner* — Frank T Palo
(74) *Attorney, Agent, or Firm* — Stuart M. Goldstein

(57) ABSTRACT

A natural growth terrarium utilizes a frustrum shaped lower root growing container having a top opening and a bottom opening and an outwardly tapered sidewall. The terrarium also includes a separate frustrum shaped upper plant stem growing container having a top opening and a bottom opening, and an inwardly tapering sidewall. The bottom opening of the upper container is configured to be removeably attached to the top opening of the lower container, such that when the containers are connected, a plant can be grown in the terrarium and its roots allowed to spread through the lower container and its upper stem allowed to grow within the upper container. When mature, plants grown in the terrarium can be safely and efficiently relocated from the terrarium to the ground where the plants are easily replanted and the terrarium removed for reuse.

6 Claims, 3 Drawing Sheets

NATURAL GROWTH TERRARIUM PLANTER

BACKGROUND OF THE INVENTION

Special care, including particular growing conditions, are required when plant or flower seeds or young seedlings are first planted. It is especially important that such newly planted seeds and seedlings are provided the proper environment, e.g. temperature, moisture, lighting, etc., in order to ensure strong and healthy early growth. Various planters, terrariums, gardening containers, and glass plant houses are used for nurturing new plants and flowers, as well as for planting and growing indoors, when colder temperatures would otherwise prevent outdoor gardening. When the young indoor plants and flowers have matured, they can be transferred to and replanted in an outside location.

While there are numerous terrariums and planters, there are none which easily, effectively and efficiently permit the relocation and replanting of plants and flowers from an indoor, early growth container directly to the ground.

SUMMARY OF THE INVENTION

It is thus an object of the present invention to provide a natural growth terrarium which addresses the disadvantages and limitations of such existing plant growth containers.

It is generally the object of the present invention to provide a natural growth terrarium which permits the transfer and replanting of mature and maturing plants and flowers from an incubator type planter or terrarium to the ultimate planted destination, i.e. to the ground, with minimal to virtually no interruption in plant growth, and no damage or injury to the natural and continued growth of stem and root systems.

It is the continuing object of the present invention to provide a natural growth terrarium which permits seeds and seedlings to be planted and grown in a healthy, controlled growing environment, and then, after the plants have grown and are more mature, allows them to be safely and efficiently relocated from terrarium to the ground, where they are easily replanted.

These and other objects are accomplished by the present invention, a natural growth terrarium which comprises a frustrum shaped lower root growing container having a top opening and a bottom opening and an outwardly tapered sidewall. The terrarium also includes a separate frustrum shaped upper plant stem growing container having a top opening and a bottom opening, and an inwardly tapering sidewall. The bottom opening of the upper container is configured to be removeably attached to the top opening of the lower container, such that when the containers are connected, a plant can be grown in the terrarium and its roots allowed to spread through the lower container and its upper stem allowed to grow within the upper container. When mature, plants grown in the terrarium can be safely and efficiently relocated from the terrarium to the ground where the plants are easily replanted and the terrarium removed for reuse.

The novel features which are considered as characteristic of the invention are set forth in particular in the appended claims. The invention, itself, however, both as to its design, construction and use, together with additional features and advantages thereof, are best understood upon review of the following detailed description with reference to the accompanying drawings.

DETAILED DESCRIPTION OF THE INVENTION

Figure 1:
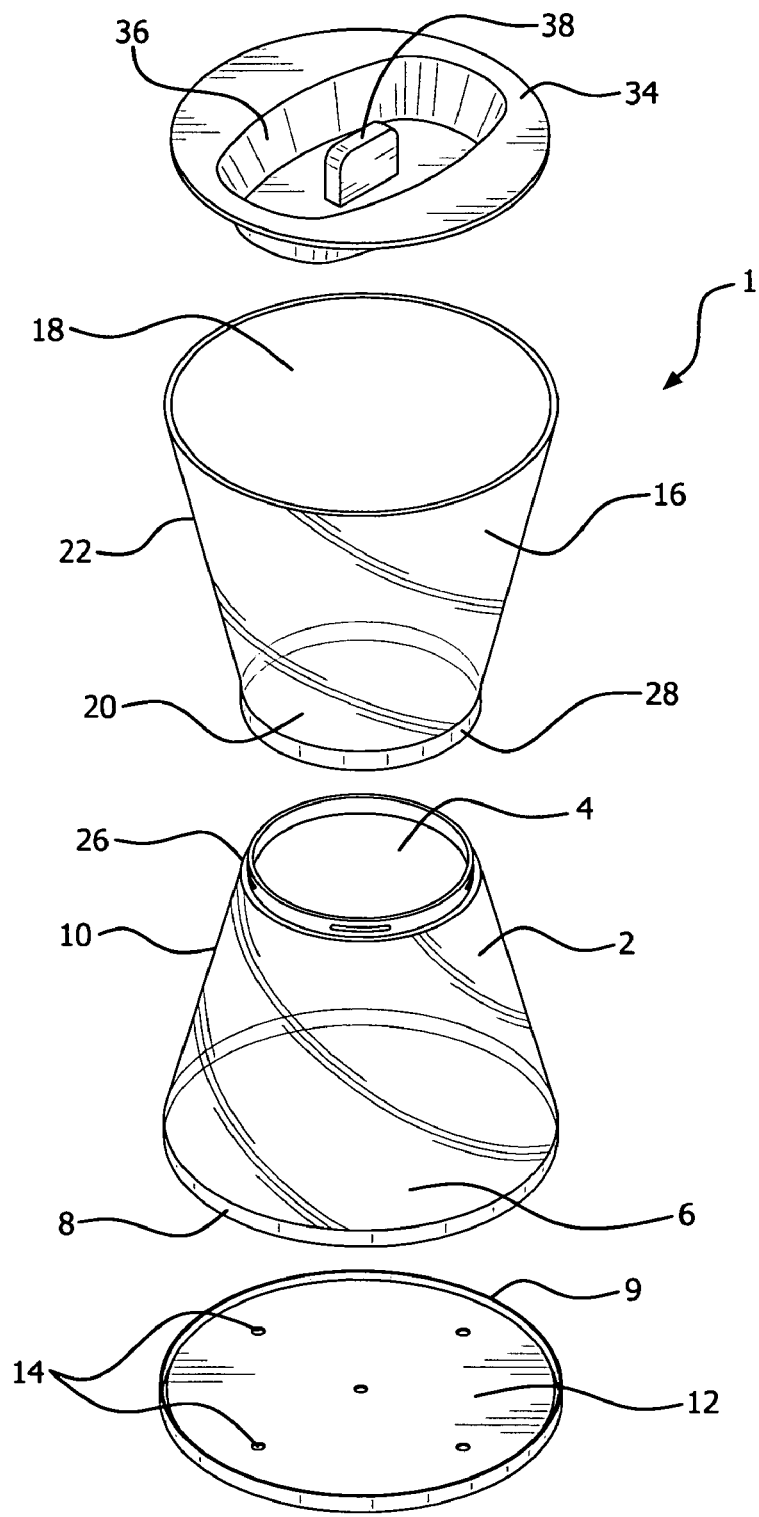
FIG. 1 is an exploded view of the components of the natural growth terrarium of the present invention.

Natural growth terrarium 1 of the present invention comprises a frustrum shaped lower root growing container 2 having a top opening 4 and bottom opening 6 which is larger than the top opening. Sidewall 10 tapers outwardly from top opening 4 to bottom opening 6. Substantially flat bottom element 12 having upstanding resilient rim 9 is configured to be removeably secured to bottom opening 6 of lower container 2 either by means of a Tupperware® type snap connection or equivalent means. Bottom element 12 comprises openings 14 for the drainage of water. It is contemplated that lower container 2, with bottom element 12 attached, is configured to be placed on a waterproof mat or similar supporting surface.

Frustrum shaped upper plant stem growing container 16, separate and independent from lower container 2, comprises top opening 18 and bottom opening 20, the bottom opening being smaller than the top opening. Sidewall 22 is inwardly tapered from top opening 18 to bottom opening 20. Top member or lid 34 is removeably sized to cover top opening 18 of upper container 16. Lid 34 comprises inset well 36 and tab handle 38, designed to allow the efficient removeable and replacement of the lid.

The upper end of lower container 2, adjacent to top opening 4, has connection means 26 configured to rotatably engage corresponding connection means 28 at the lower end of upper container 16. The connection means can be threads, interlocking members, tape tabs or equivalent connection elements.

Figure 2:
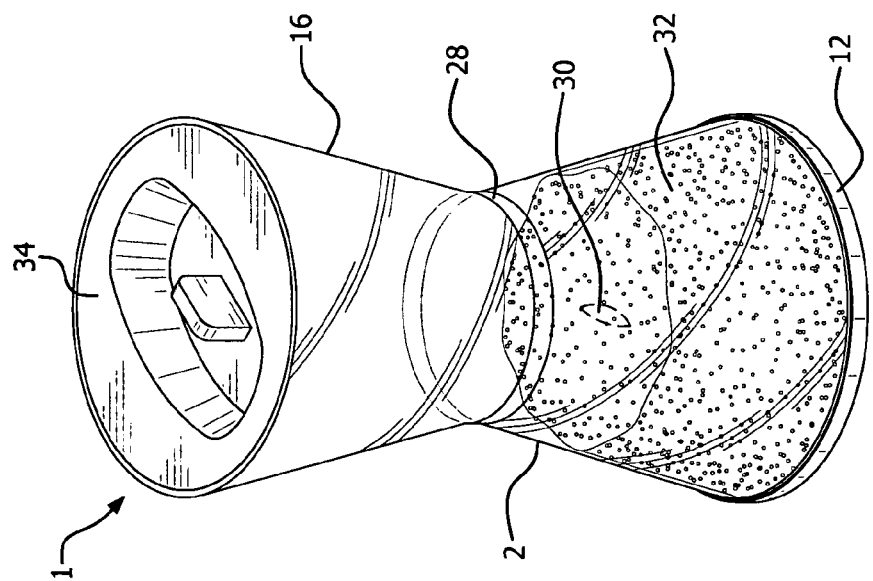
FIG. 2 is a view of the natural growth terrarium of the present invention showing a seed or seedling initially planted therein.

FIGS. 2-5 illustrate the method utilized by natural growth terrarium 1. FIG. 2 shows seed or seedling 30 planted in growing soil 32 in lower container 2 of terrarium 1. When seedling 30 is first planted, bottom element 12 is secured to the bottom of lower container 2 and upper container 16 is connected to the lower container via connection means 26 and 28.

After seedling 30 is properly fertilized and watered, lid 34 is placed over top opening 18 of upper container 16 and terrarium 1 is positioned to ensure appropriate sunlight or similar growth lights are directed onto seedling 30. Openings 14 in bottom element 12 provide drainage of water through soil 32. The positioning of lid or top member 34 also ensures that moisture, in the form of condensation, collects within terrarium 1, providing additional favorable conditions for the growth of seedling 30.

Figure 3:
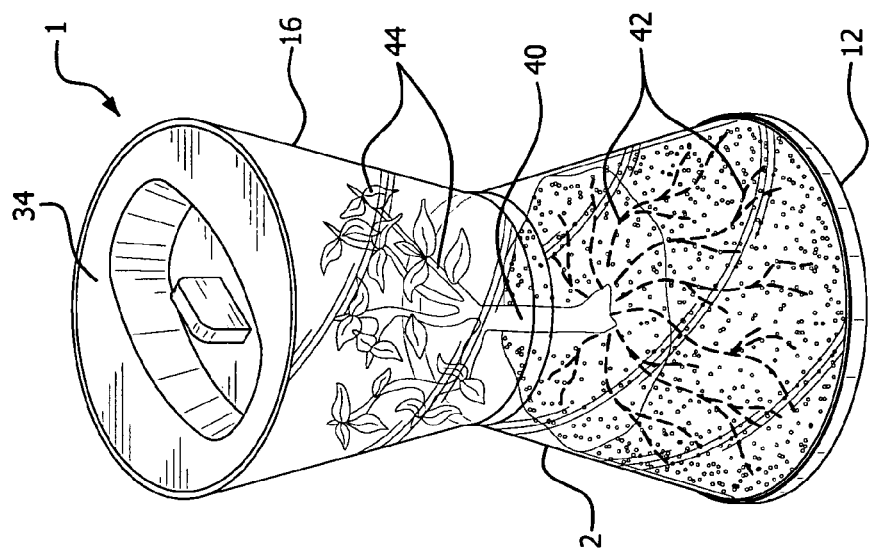
FIG. 3 shows the natural growth terrarium of the present invention with a maturing plant growing therein.

FIG. 3 shows additional benefits of terrarium 1 in that as seedling 30, now plant 40, continues to grow within the terrarium, the unique upwardly tapered shape of lower container 2 permits the growth of outwardly spreading roots 42 and the unique downwardly tapered shape of upper container 16 permits the stems, branches, and flowers 44 of plant 40 to grow up and outward.

Figure 5:
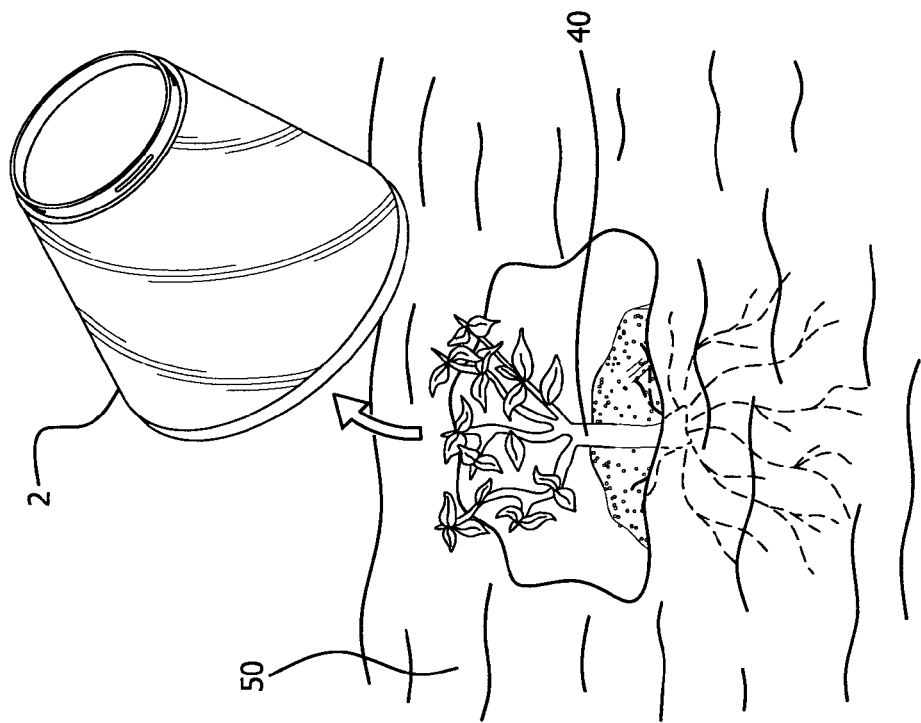
FIG. 5 shows the mature plant fully planted within the ground, with the lower container of the natural growth terrarium of the present invention removed.
Figure 4:
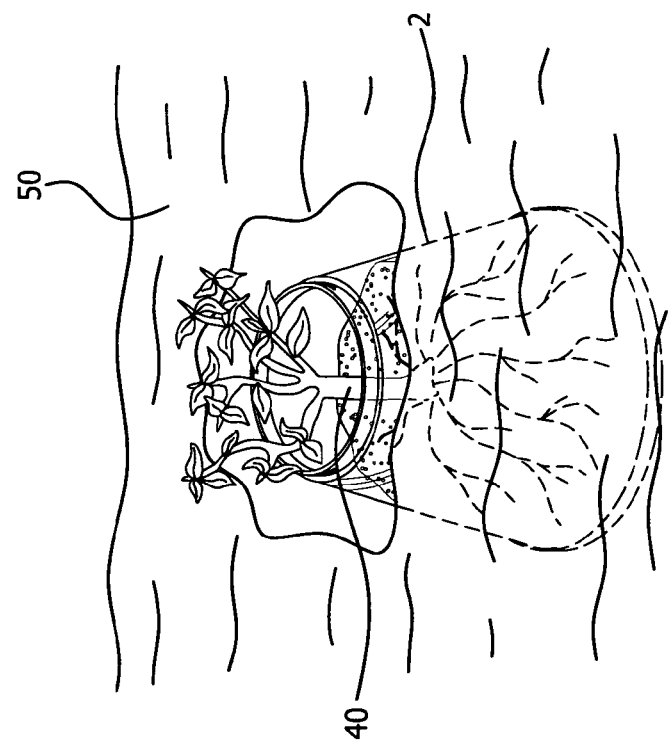
FIG. 4 shows the lower container of the natural growth terrarium of the present invention housing a mature plant and being relocated and planted within the ground.

When plant 40 is mature enough to be planted within the ground, upper container 16 with lid 34 is disconnected from lower container 2. Bottom element 12 is also removed from lower container 2. As best seen in FIG. 4, lower container 2 containing plant 40, is then planted within ground 50. As seen in FIG. 5, once plant 40 is relocated into ground 50, upper container 2 is removed. Plant 40 is now free to continue to grow within the ground, without the aid of terrarium 1.

Thus, by means of natural growth terrarium 1 of the present invention, the conditions for growing seeds, seedlings, and immature plants can be carefully monitored and controlled indoors, until such plants are strong enough to be relocated and planted out of doors, within the ground. Terrarium 1 provides a simple, yet effective means of plant growth which ensures for the ultimate health and well-being of plants and flowers, until they are mature enough to accept outdoor environmental conditions.

Certain novel features and components of this invention are disclosed in detail in order to make the invention clear in at least one form thereof. However, it is to be clearly understood that the invention as disclosed is not necessarily limited to the exact form and details as disclosed, since it is apparent that various modifications and changes may be made without departing from the spirit of the invention.

The invention claimed is:

1. A natural growth terrarium for growing plants comprising:
   a frustrum shaped lower root growing container having a top opening, a bottom opening larger than the top opening, and a sidewall outwardly tapered from the top opening to the bottom opening;
   a substantially flat bottom element and means to removeable connect the bottom element over the bottom opening;
   a separate, frustrum shaped upper plant stem growing container having a top opening, a bottom opening smaller than the top opening, and a sidewall inwardly tapering from the top opening to the bottom opening;
   a removeable lid sized to cover the top opening of the upper container; and
   means to removeably interconnect the lower and upper containers, whereby when the lower container and upper container are interconnected, a plant located in the terrarium grows with its roots spreading outwardly towards the lower container sidewall and its upper stem and branches spreading outwardly within the upper container, and whereby when the lower and upper containers are disconnected, the plant remains within the lower container to be relocated and planted within the ground.

2. The natural growth terrarium as in claim 1 wherein the substantially flat bottom element comprises drainage holes.

3. The natural growth terrarium as in claim 1 wherein the means to removeably interconnect the lower and upper containers comprises a rotatable connection.

4. A method for growing a plant in a natural growth terrarium comprising a lower section with a top opening and a bottom opening, a separate upper section with a top opening and a bottom opening, a flat bottom element removeably connected to the bottom opening of the lower container, and a removeable lid sized to cover the top opening of the upper container, the steps of the method comprising:
   connecting the bottom element to the bottom opening of the lower container;
   substantially filling the lower container with plant growing soil;
   planting a seed or seedling in the soil of the lower container;
   connecting the upper container to the lower container such that the top opening of the lower container is contiguous with the bottom opening of the upper container;
   placing the removeable lid on the top opening of the upper container;
   permitting the seed or seedling to grow within the lower and upper containers such that the roots of the planted seed or seedling emanates outward within the lower container and its stem and branches grow upward and outward within the upper container;
   allowing the planted seed or seedling to grow into a mature plant;
   disconnecting and removing the upper container from the lower container;
   removing the bottom element from the lower container;
   planting the lower container carrying the mature plant into the ground;
   removing the lower container from the ground; and
   continuing the growth of the mature plant within the ground.

5. The method as in claim 4 further comprising the steps of removing the lid from the top opening of the upper container and watering the planted seed or seedling.

6. The method as in claim 4 further comprising the steps of allowing the build-up of condensation within the upper and lower containers to provide moisture for the planted seed or seedling.

* * * * *